US006216226B1

(12) United States Patent
Agha et al.

(10) Patent No.: US 6,216,226 B1
(45) Date of Patent: Apr. 10, 2001

(54) METHOD AND SYSTEM FOR DYNAMICALLY SELECTING A BOOT PROCESS WITHIN A DATA PROCESSING SYSTEM

(75) Inventors: Salim Agha, Rochester, MN (US); Chetan Mehta, Austin; Maulin Ishwarbhai Patel, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/165,625

(22) Filed: Oct. 2, 1998

(51) Int. Cl.[7] ..... G06F 9/00
(52) U.S. Cl. ..... 713/2; 713/1
(58) Field of Search ..... 713/2, 1

(56) References Cited

U.S. PATENT DOCUMENTS 5,701,420 * 12/1997 Nedwek et al. ..... 395/284
5,790,850 * 8/1998 Natu ..... 395/652
5,933,631 * 8/1999 Mealey et al. ..... 395/652
5,951,686 * 9/1999 McLaughlin et al. ..... 713/2
5,987,625 * 11/1999 Wolff ..... 714/36
6,014,744 * 1/2000 McKaughan et al. ..... 713/2

* cited by examiner

*Primary Examiner*—Thomas Lee
*Assistant Examiner*—Nitin Patel
(74) *Attorney, Agent, or Firm*—Leslie A. VanLeeuwen; Felsman, Bradley, Vaden, Gunter & Dillon, LLP

(57) ABSTRACT

A method and system for faster initial program loads by normally booting a data processing system without extended diagnostic tests is disclosed. A service processor is provided and located within the data processing system to monitor the data processing system during runtime operations for a system failure. When a system failure occurs, the service processor enables a diagnostic flag located in non-volatile memory. On the first or next boot of the data processing system after repair of the system failure, the diagnostic flag indicates to the service processor to perform an extended diagnostics test. Upon completion of the extended diagnostics test, the diagnostic flag is disabled and the service processor once again monitors the data processing system for a system failure.

20 Claims, 3 Drawing Sheets

100
110 RAM
120 Memory Controller
130a-n CPU
140 Host Bus
150 Bus Controller
160 I/O Bus
CMOS 170
System Firmware 190
Other I/O Devices 197
195 Service Processor
POST 200

METHOD AND SYSTEM FOR DYNAMICALLY SELECTING A BOOT PROCESS WITHIN A DATA PROCESSING SYSTEM

BACKGROUND OF THE INVENTION

1. Technical Field

The present invention relates to a method and system for data processing or information handling systems in general and, in particular, to a method and system for dynamically selecting a boot process in a computer system. Still more particularly, the present invention relates to a method and system for automatically performing extended hardware diagnostics during a boot sequence after a system failure has occurred within a network environment without user intervention.

2. Description of the Prior Art

Due to today's complex server systems or multi-processor system designs, an effort to improve overall system availability by designing for rapid initial program load (IPL) operations has become a necessary requirement by the end users of these systems. In the prior art, speed and availability was achieved by curtailing, or removing the system Power-On Self Test (POST) operations entirely. In removing or curtailing POST, system integrity was comprised and if the system developed a problem, the end user would not be aware of it until the failing part was used, or after damage was done to the user's data. Therefore, maintaining system integrity and determining when the system has problems are important requirements. Furthermore, performing system POST with its extended diagnostics on every boot for large complex server systems increases the boot time typically by a factor of three to four times in a normal day-to-day end user environment, an unacceptable situation.

Therefore, there is a need for performing subsequent minimum boot operations during power-on after extended diagnostics required in a full POST operation have been completed. Furthermore, there is a need for automatically invoking extended diagnostics without end user intervention when a system failure has been detected and after the failure has been corrected, returning to subsequent minimum boot operations. The subject invention herein solves all of these problems in a new and unique manner that has not been part of the art previously.

SUMMARY OF THE INVENTION

In view of the foregoing, it is therefore an object of the present invention to provide an improved method and system for faster initial program loads in a computer system or information handling system.

It is another object of the present invention to provide an improved method and system for dynamically switching a boot process in cases where a system failure has occurred within a network environment.

It is yet another object of the present invention to provide an improved method and system for automatically performing extended hardware diagnostics during a boot sequence after a system failure has occurred within a network environment without user intervention.

In accordance with a preferred embodiment of the present invention, faster initial program loads are achieved by normally booting a data processing system without extended diagnostic tests. A service processor is provided and located within the data processing system to monitor the data processing system during runtime operations for a system failure. When a system failure occurs, the service processor enables a diagnostic flag located in non-volatile memory. On the first or next boot of the data processing system after repair or subsequent reboot of the system failure, the diagnostic flag indicates to the service processor to perform an extended diagnostics test. Upon completion of the extended diagnostics test, the diagnostic flag is disabled and the service processor once again monitors the data processing system for a system failure.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DESCRIPTION OF A PREFERRED EMBODIMENT

The present invention may be executed in a variety of computer systems under a number of different operating systems or information handling systems. In addition, the computer system may be a stand-alone system or part of a network such as a local-area network (LAN) or a wide-area network (WAN). For the purpose of illustration, a preferred embodiment of the present invention, as described below, is implemented on server business computers, such as the RS/6000 model S70, manufactured by International Business Machines Corporation.

Figure 1:
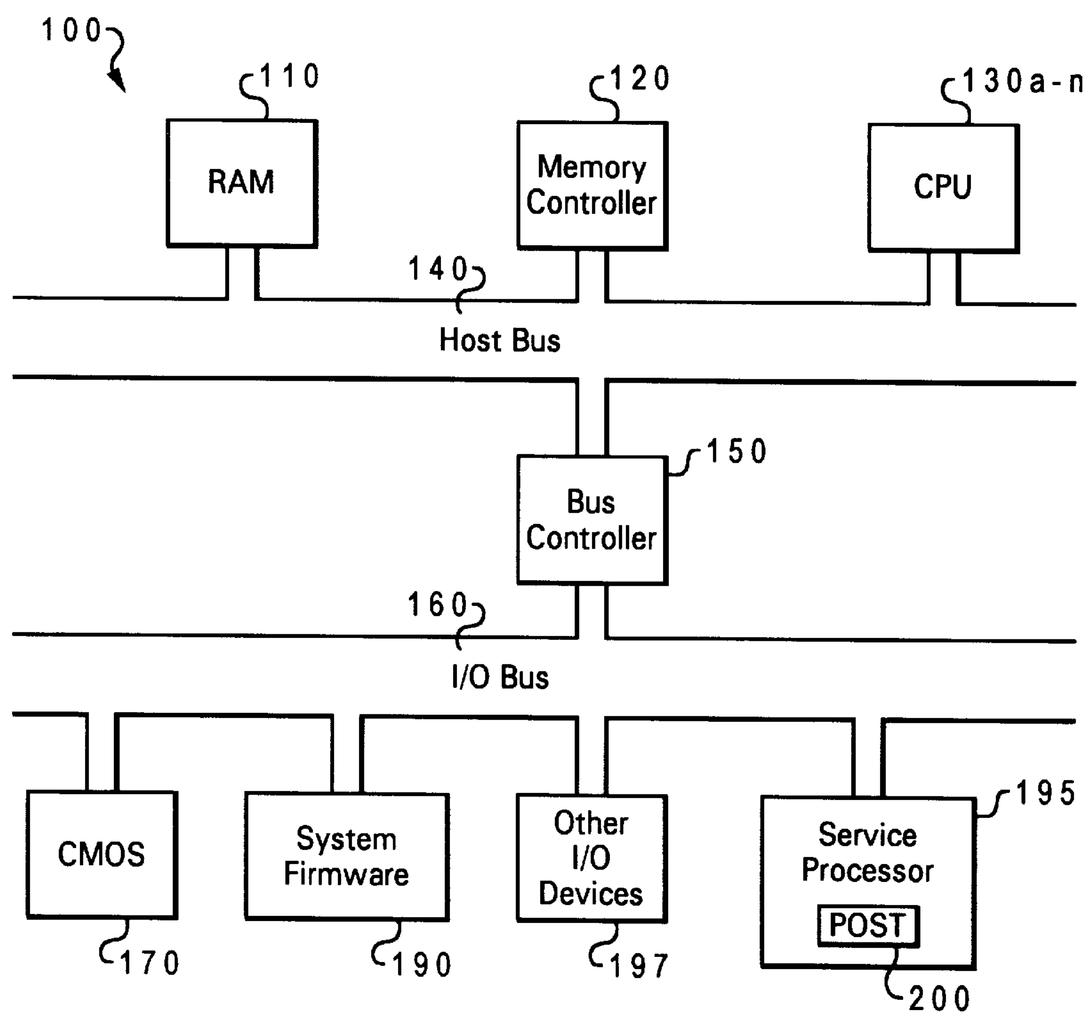
FIG. 1 is a system block diagram of a symmetrical multi-processing system, which may be utilized in conjunction with a preferred embodiment of the present invention.

Referring now to the drawings and in particular to FIG. 1, there is depicted a system block diagram of a typical symmetrical multi-processing system 100 which may be utilized in conjunction with a preferred embodiment of the present invention. As shown, multiple central processing units (CPUs) **130*a* to 130*n* are connected to system RAM 110 via a memory controller 120 and host bus 140. The multiple central processing units (CPUs) 130*a* to 130*n* are further connected to other hardware devices via host bus 140, bus controller 150, and I/O bus 160. These other hardware devices include, for example, system firmware Read-Only Memory (ROM) 190, service processor 195 in which a Power On Self Test (POST) program 200 is stored, a nonvolatile storage device, such as CMOS 170, as well as other I/O devices, including for example, a keyboard, display, mouse, joystick, or the like, all of which are collectively designated by reference numeral 197**.

The machine-executed method of the present invention is performed by executable computer software contained in the service processor 195. The service processor is a built in microcontroller in a symmetrical multi-processing or server system. An actual implementation of such a service processor might be used on IBM server based microprocessors, or on other suitable processor-based computer systems. Besides assisting the server system during Initial Program Load (by testing the system hardware) its primary responsibility is to monitor the health of the server system. If the server system fails (due to hardware or software fault) the service processor 195 is able to detect the condition and take actions like attempt reboot/recovery or Call Home to report the problem. It should be understood that the service processor 195 on IBM based servers does not run the native operating system (AIX, NT, etc) but instead uses its own operating environment. Additionally, the service processor 195 typically operates on Standby Power and is therefore "alive" even when the system is powered off. This allows the service processor 195 to support remote operation especially useful to perform remote diagnostics.

(It will be appreciated by those of ordinary skill of course, that references to the performance of method steps by computer software actually mean that a computer, or one of its components, is performing the method steps in response to the instructions encoded in the computer software.)

Figure 2:
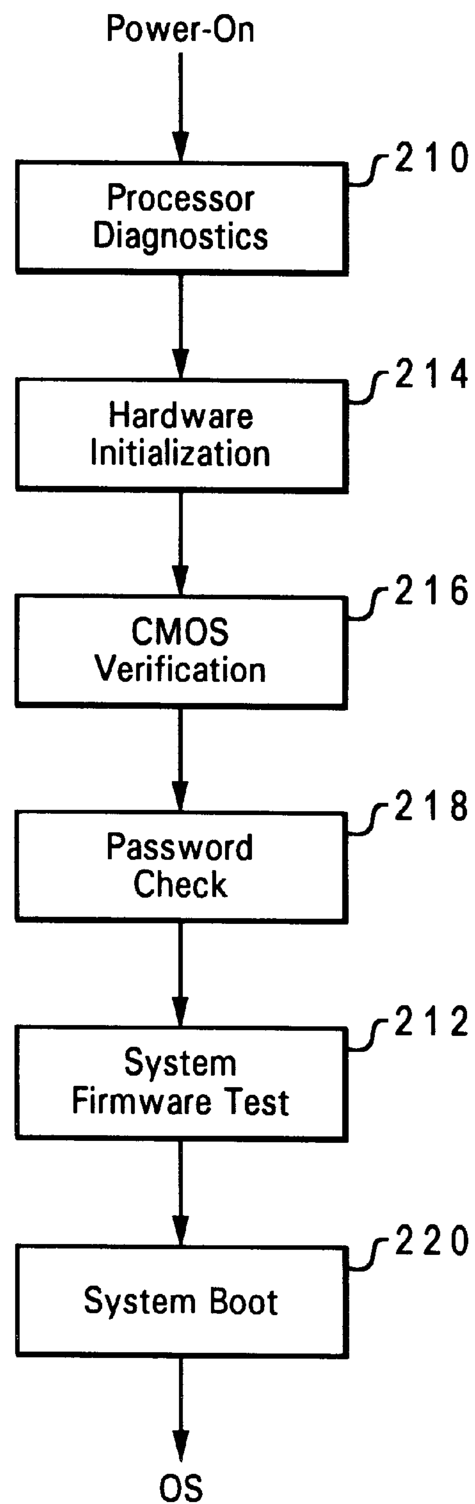
FIG. 2 is a flow chart depicting a typical symmetrical multi-processing system boot process in accordance with the teachings of this invention.

Referring now to FIG. 2, there is shown a flow chart depicting a typical symmetrical multi-processing system boot for a typical server system or multi-processing system. As shown in step 210, upon power up, processor diagnostics are performed by the service processor 195. Following this, a hardware initialization step 214 is performed. All of these steps are well known in the prior art and can be performed in any desired fashion. However, in accordance with a preferred embodiment of the present invention, the service processor 195 may go through the normal booting process without the extended diagnostic testing required in steps 210 and 214, as will be more fully described below. Next, the service processor 195 performs an integrity check 216 on the contents of CMOS memory to verify its authenticity. If the CMOS passes its integrity check, the password status may be deemed "good" and therefore proceed down normal paths, prompting a password check 218 and system firmware 190 test, shown in step 212 wherein the system may be booted 220 in the normal manner.

Figure 3:
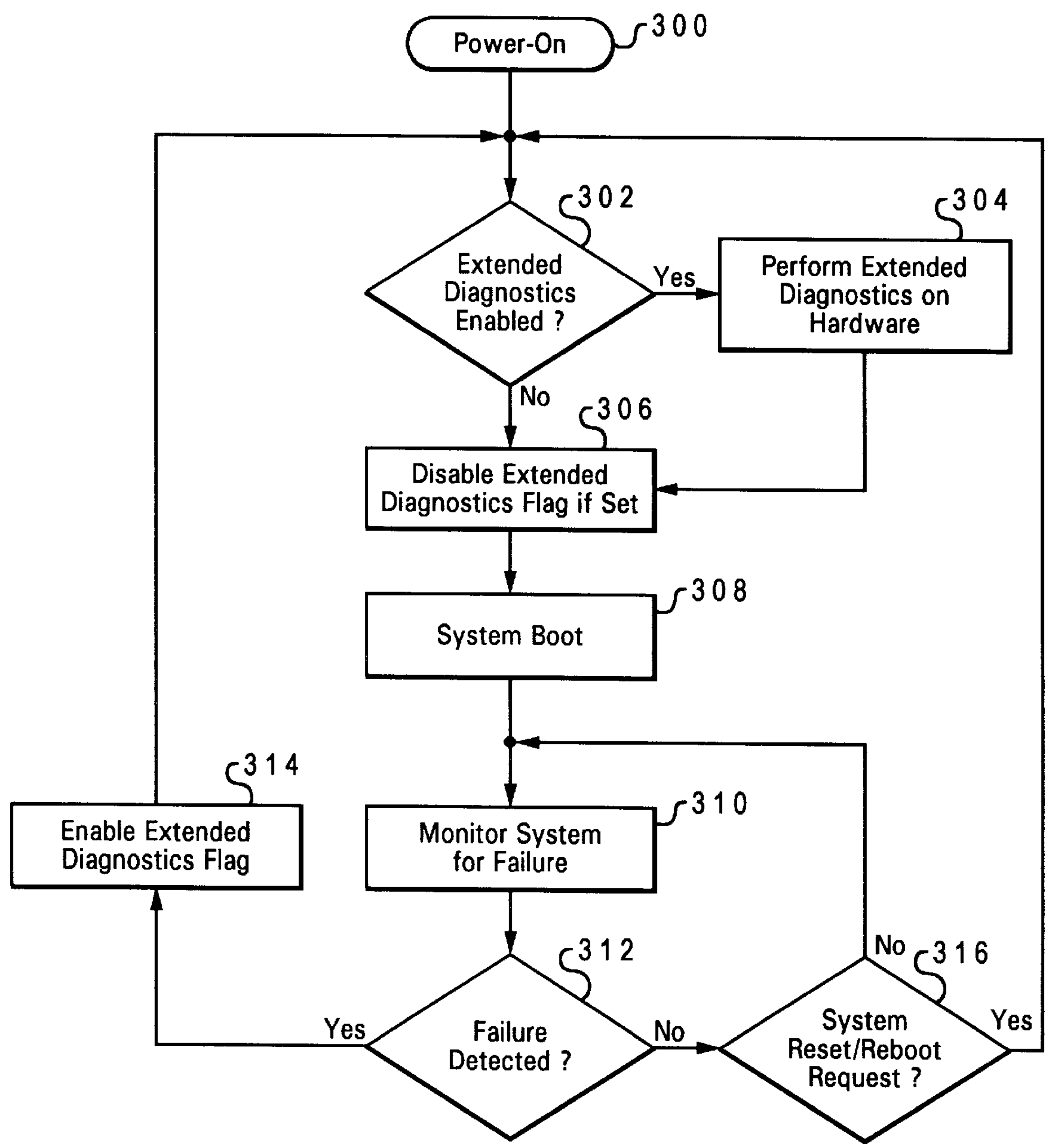
FIG. 3 is a high-level logic flow diagram of a method for dynamically selecting a boot process when a power-on request is received by a computer system within a network environment, in accordance with a preferred embodiment of the present invention.

With reference now to FIG. 3, there is illustrated a high-level logic flow diagram of a method for dynamically selecting a boot process when a power-on request is received by a computer system within a network environment. Starting at block 300, when a request for power-on is received by the computer system 100, the service processor 195 first checks to see if extended diagnostics are to be performed, as shown in step 302. This step is accomplished by the service processor 195 reading a location in memory to see if a diagnostics flag has previously been enabled. The conditions under which the diagnostics flag is enabled will be more fully described below. If the diagnostics flag is enabled, the service processor 195 performs extended diagnostic tests on hardware as shown in step 304. Extended diagnostic tests is defined as a full system boot of all the hardware in computer system 100. By way of example, but not of limitation, the extended diagnostic tests include the logical built-in self test, array built-in self test, wire testing and exhausting mainstore diagnostics, which are all known in the art.

Referring once again to FIG. 3, If the diagnostics flag is not set or the service processor 195 has performed the extended diagnostics tests, the process proceeds to step 306 wherein the extended diagnostics flag is disabled. The process then proceeds to step 308 and the system is booted with a normal boot routine absent the extended diagnostics testing. It should be noted that the diagnostics flag is always disabled whether or not the flag was enabled so that the system boot will be presented with cleared registers when starting the boot process. The service processor 195 after system boot then monitors the system for a system failure, as shown in step 310. As shown in step 312, when a system failure is detected, the extended diagnostics flag is enabled by the system processor 195. The extended diagnostics flag may be located in a register in memory and in the preferred embodiment is located in non-volatile memory such as CMOS 170 so it persists across power cycles. After the system failure is corrected, the system is again rebooted by either supplying electrical power to the computer system or soft booting the system, and with the flag set, the extended diagnostics are performed and the process proceeds as discussed above. If no failure is detected and a reboot request is received, as shown in step 316, the system is rebooted without the extended diagnostics test and the process continues as described above. Also as shown in step 316, if no reboot request is received the system processor 195 continues monitoring for a system failure.

As has been described, the present invention provides a method and system for the service processor firmware to allow two different kinds of initial program load (IPL) modes namely, FAST and SLOW. During the FAST mode IPL, certain tests are skipped thus contributing to a faster IPL (by skipping exhausting tests on the system hardware). During the SLOW mode IPL, all the hardware diagnostics test are performed and thus contribute to a slower IPL time but provide for better error isolation. In a day-to day customer environment, the SLOW mode IPL on a regular system operation can add a significant amount to the boot time (e.g. influenced by size of mainstorage). This time can be greatly reduced by using the FAST mode IPL as no hardware changes have occurred. However, after every system crash, the next boot is forced to SLOW mode IPL thus making sure extended diagnostics are performed on the first boot after the crashed system had been fixed or a reboot following system failure.

It is also important to note that although the present invention has been described in the context of a fully functional security system, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for dynamically selecting a boot process within a data processing system, said method comprising the steps of:

normally booting a data processing system without extended diagnostic tests in response to an application of electrical power to said data processing system;

monitoring said data processing system to detect a system failure;

in response to a detected system failure repairing said detected system failure; and automatically rebooting said data processing system with extended diagnostics tests subsequent to said repair of said system failure in response to a first application of electrical power to said data processing system thereafter.

2. The method for dynamically selecting a boot process within a data processing system according to claim 1, wherein said method of monitoring said data processing system for a system failure further includes enabling a diagnostics flag in memory when a system failure is detected.

3. The method for dynamically selecting a boot process within a data processing system according to claim 2, wherein said method of rebooting said data processing system with extended diagnostics tests further includes a step of disabling said diagnostic flag.

4.The method for dynamically selecting a boot process within a data processing system according to claim 2, wherein said method of monitoring said data processing system for a system failure further includes storing said diagnostics flag in non-volatile memory.

5. The method for dynamically selecting a boot process within a data processing system according to claim 1, wherein said method of rebooting said data processing system with extended diagnostics tests further includes performing a logical built-in self test of all hardware.

6. The method for dynamically selecting a boot process within a data processing system according to claim 5, wherein said method of rebooting said data processing system with extended diagnostics tests further includes performing an array built-in self test of all hardware.

7. The method for dynamically selecting a boot process within a data processing system according to claim 1, wherein said method of rebooting said data processing system with extended diagnostics tests further includes performing a wire test.

8. The method for dynamically selecting a boot process within a data processing system according to claim 1, wherein said method of rebooting said data processing system with extended diagnostics tests further includes performing exhausting mainstore diagnostics.

9. The method for dynamically selecting a boot process within a data processing system according to claim 8, wherein said method of normally booting a data processing system without extended diagnostic tests further includes eliminating all hardware testing.

10. An information handling system, comprising:

means for normally booting a data processing system without extended diagnostic tests when electrical power is applied to said information handling system;

means for monitoring said information handling system to detect a system failure;

means for repairing a detected system failure in response to detecting said system failure; and means for automatically rebooting said information handling system with extended diagnostics tests subsequent to said repairing means repairing said system failure when electrical power is next applied to said information handling system.

11. An information handling system according to claim 10, wherein said means for monitoring said information handling system for a system failure further comprises means for enabling a diagnostics flag in memory when a system failure is detected.

12. An information handling system according to claim 11, wherein said means for rebooting said information handling system with extended diagnostics tests further comprises means for disabling said diagnostic flag.

13. An information handling system according to claim 11, wherein said means for monitoring said information handling system for a system failure further comprises means for storing said diagnostics flag in non-volatile memory.

14. An information handling system according to claim 10, wherein said means for rebooting said information handling system with extended diagnostics tests further comprises means for performing a logical built-in self test of all hardware.

15. An information handling system according to claim 14, wherein said means for rebooting said information handling system with extended diagnostics tests further comprises means for performing an array built-in self test of all hardware.

16. An information handling system according to claim 10, wherein said means for rebooting said information handling system with extended diagnostics tests further comprises means for performing a wire test.

17. An information handling system according to claim 10, wherein said means for rebooting said information handling system with extended diagnostics tests further comprises means for performing exhausting mainstore diagnostics.

18. An information handling system according to claim 10, wherein said means for normally booting said information handling system without extended diagnostic tests further comprises means for eliminating all hardware testing.

19. A computer program product residing on a computer usable medium for dynamically selecting a boot process to an information handling system, said computer program product comprising:

instruction means for normally booting a data processing system without extended diagnostic tests when electrical power is applied to said information handling system;

instruction means for monitoring said information handling system to detect a system failure;

instruction means for repairing a detected system failure in response to detecting a system failure; and instruction means for automatically rebooting said information handling system with extended diagnostics tests subsequent to said instruction means for repairing repairing said system failure when electrical power is next applied to said information handling system.

20. A computer program product according to claim 19, wherein said instruction means for monitoring said information handling system for a system failure further comprises means for enabling a diagnostics flag in memory when a system failure is detected and means for disabling said diagnostics flag after reboot subsequent to said repair of said system failure.

* * * * *